US012399735B2

(12) United States Patent
Tune et al.

(10) Patent No.: US 12,399,735 B2
(45) Date of Patent: Aug. 26, 2025

(54) MANAGING TRANSACTION REQUEST IDENTIFIERS AND INDICATORS TO CONTROL OR BYPASS IN-ORDER HANDLING OF TRANSACTION REQUESTS

(71) Applicant: ARM LIMITED, Cambridge (GB)

(72) Inventors: Andrew David Tune, Dronfield (GB); Daniel Sara, Sheffield (GB); Guanghui Geng, Sheffield (GB)

(73) Assignee: Arm Limited, Cambridge (GB)

( * ) Notice: Subject to any disclaimer, the term of this patent is extended or adjusted under 35 U.S.C. 154(b) by 434 days.

(21) Appl. No.: 16/345,789

(22) PCT Filed: Dec. 13, 2017

(86) PCT No.: PCT/GB2017/053725
§ 371 (c)(1),
(2) Date: Apr. 29, 2019

(87) PCT Pub. No.: WO2018/115814
PCT Pub. Date: Jun. 28, 2018

(65) Prior Publication Data
US 2019/0266010 A1    Aug. 29, 2019

(30) Foreign Application Priority Data
Dec. 19, 2016  (GB) .................... 1621638.4

(51) Int. Cl.
*G06F 9/46*    (2006.01)
*G06F 9/50*    (2006.01)
(Continued)

(52) U.S. Cl.
CPC ............ *G06F 9/466* (2013.01); *G06F 9/5005* (2013.01); *G06F 13/1673* (2013.01); *G06F 13/36* (2013.01); *G06F 13/385* (2013.01)

(58) Field of Classification Search
CPC .... G06F 13/36; G06F 13/1673; G06F 9/5005; G06F 9/466; G06F 13/385
(Continued)

(56) References Cited

U.S. PATENT DOCUMENTS 6,694,410 B1 *  2/2004  Dang ................... G06F 13/405
                                          711/147
7,072,817 B1 *  7/2006  Carey .................... G06F 30/30
                                          716/108

(Continued)

FOREIGN PATENT DOCUMENTS

JP    2008-41099     2/2008
JP    2014-517431    7/2014

OTHER PUBLICATIONS

ARM, AMBA® AXI™ and ACE™ Protocol Specification, 2011, ARM, AXI3™, AXI4™, and AXI4-Lite™ ACE and ACE-Lite™, pp. 1-306 (Year: 2011).*

(Continued)

*Primary Examiner* — Phong H Nguyen
(74) *Attorney, Agent, or Firm* — NIXON & VANDERHYE P.C.

(57) ABSTRACT

A transaction handling device comprises transaction handling circuitry to handle a transaction request for a data processing transaction, the transaction request having an associated identifier such that at least an aspect of processing for each of a set of transaction requests having the same identifier must be performed in the order of issue of that set of transactions; and detection circuitry to detect the state of an indicator associated with the identifier to indicate whether that identifier relates to more than one concurrently pending transaction request.

8 Claims, 5 Drawing Sheets

(51) Int. Cl.
*G06F 13/16* (2006.01)
*G06F 13/36* (2006.01)
*G06F 13/38* (2006.01)

(58) Field of Classification Search
USPC .................................. 707/607, 703, 769
See application file for complete search history.

(56) References Cited

U.S. PATENT DOCUMENTS

| | | | |
|---|---|---|---|
| 7,170,989 | B1 | 1/2007 | Aubuchon et al. |
| 11,238,140 | B2* | 2/2022 | Dean .................... H04L 9/0618 |
| 2002/0069326 | A1* | 6/2002 | Richardson ......... G06F 12/0859 |
| | | | 711/E12.051 |
| 2003/0225956 | A1* | 12/2003 | Riley .................. G06F 13/4027 |
| | | | 710/309 |
| 2005/0138252 | A1* | 6/2005 | Gwilt ..................... G06F 13/36 |
| | | | 710/110 |
| 2007/0067549 | A1* | 3/2007 | Gehman ............. G06F 13/4031 |
| | | | 710/315 |
| 2008/0040523 | A1 | 2/2008 | Bruce |
| 2011/0185102 | A1 | 7/2011 | Deogharia et al. |
| 2012/0226742 | A1* | 9/2012 | Momchilov .......... G06F 3/1454 |
| | | | 709/203 |
| 2012/0290752 | A1 | 11/2012 | Lim |
| 2013/0246682 | A1* | 9/2013 | Jandhyam ........... G06F 13/1626 |
| | | | 710/310 |
| 2014/0068204 | A1 | 3/2014 | Yu |
| 2014/0143487 | A1* | 5/2014 | Habusha ............. G06F 12/0831 |
| | | | 711/105 |
| 2015/0199286 | A1* | 7/2015 | Hughes ............... G06F 13/1673 |
| | | | 710/310 |
| 2015/0323956 | A1* | 11/2015 | Goyal ................. G06F 11/0745 |
| | | | 713/600 |
| 2016/0188501 | A1* | 6/2016 | Chan .................. G06F 13/1673 |
| | | | 710/113 |
| 2019/0188164 | A1* | 6/2019 | Avrukin ................ G06F 3/0658 |

OTHER PUBLICATIONS

ARM, AMBA® AXI™ and ACE™ Protocol Specification, 2011, ARM, AXI3™, AXI4™, and AXI4-Lite™ ACE and ACE-Lite™, pp. 1-306 (Year: 2011) (Year: 2011).*
ARM, AMBAR AXI™ and ACE™ Protocol Specification, 2011, ARM, AXI3™, AXI4™, and AXI4-Lite™ ACE and ACE-Lite ™, pp. 1-306 (Year: 2011).*
Shaila S Math, Manjula R. B, S.S. Manvi, and Paul Kaunds, "Data Transactions on System-on-Chip Bus Using AXI4 Protocol", 2011, downloaded from the Internet, URL: https://ieeexplore.ieee.org/stamp/stamp.jsp?tp=&arnumber=6129797, pp. 1-5. (Year: 2011).*
Taylor et al., How to manage state in REST, dated Apr. 15, 2010, pp. 1-2, downloaded from the Internet on Jun. 6, 2022 using URL: https://stackoverflow.com/questions/2641901/how-to-manage-state-in-rest (Year: 2010).*
International Search Report and Written Opinion of the ISA for PCT/GB2017/053725, mailed Mar. 7, 2018, 11 pages.
Combined Search and Examination Report for GB1621638.4, mailed Jun. 12, 2017, 6 pages.
Office Action for EP Application No. 17817830.7 dated Jul. 20, 2020, 5 pages.
Summons to attend oral proceedings for EP Application No. 17817830.7 dated Mar. 4, 2021, 6 pages.
Office Action for JP Application No. 2019-531266 mailed Oct. 8, 2021 and English translation, 4 pages.
Office Action for KR Application No. 2019-7019101 dated Apr. 14, 2022 and redacted English translation, 10 pages.
Office Action for KR Application No. 10-2019-7019101 dated Aug. 1, 2022 and English translation.
First Office Action for CN Application No. 201780076771.0 dated Oct. 8, 2022 and English translation, 17 pages.

* cited by examiner

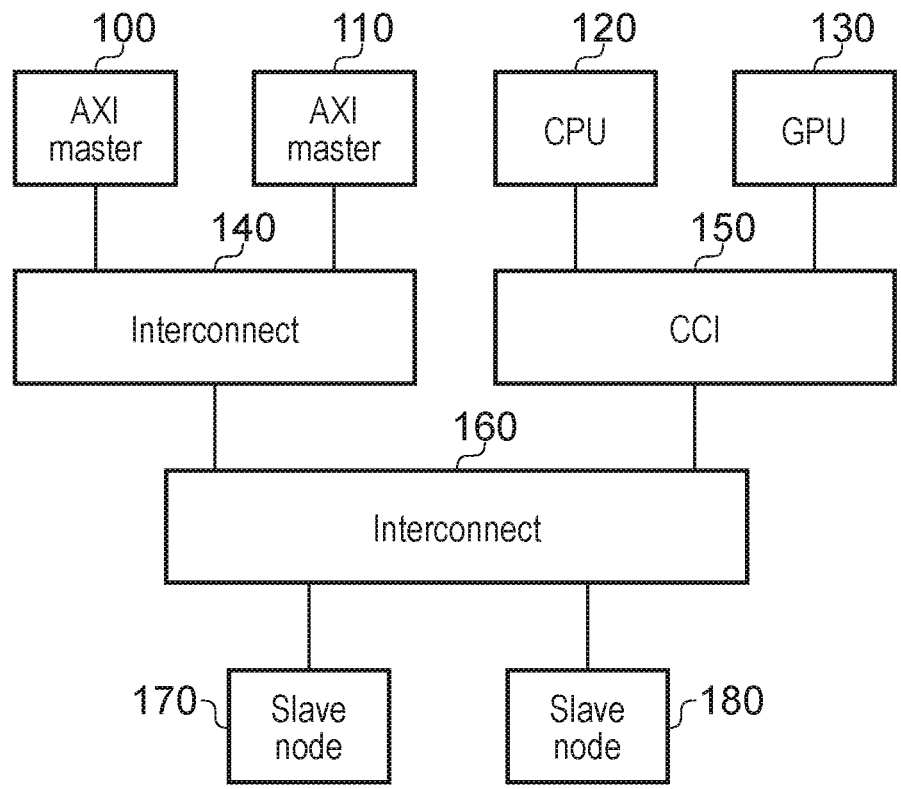
FIG. 1
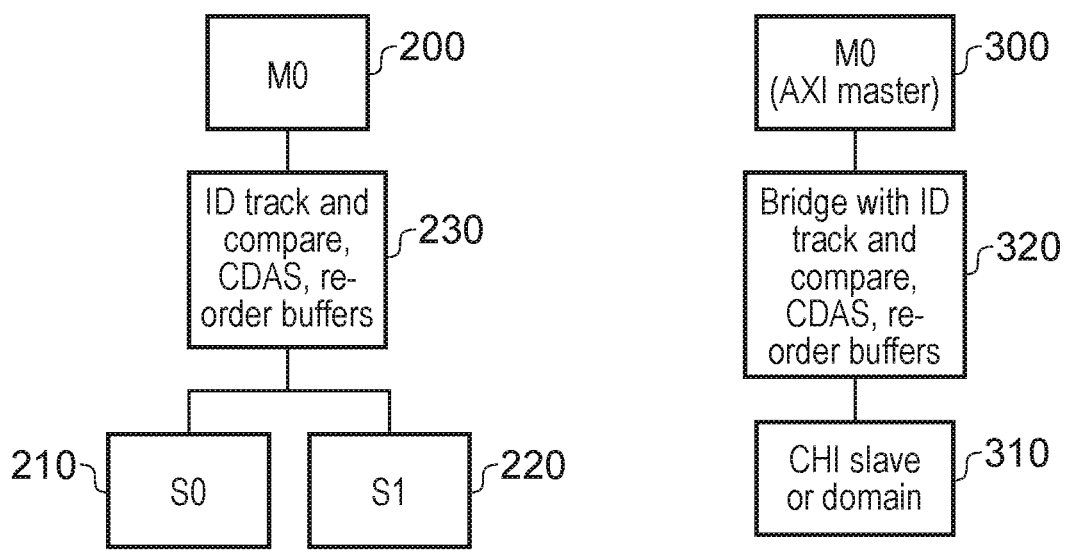
FIG. 2
FIG. 3

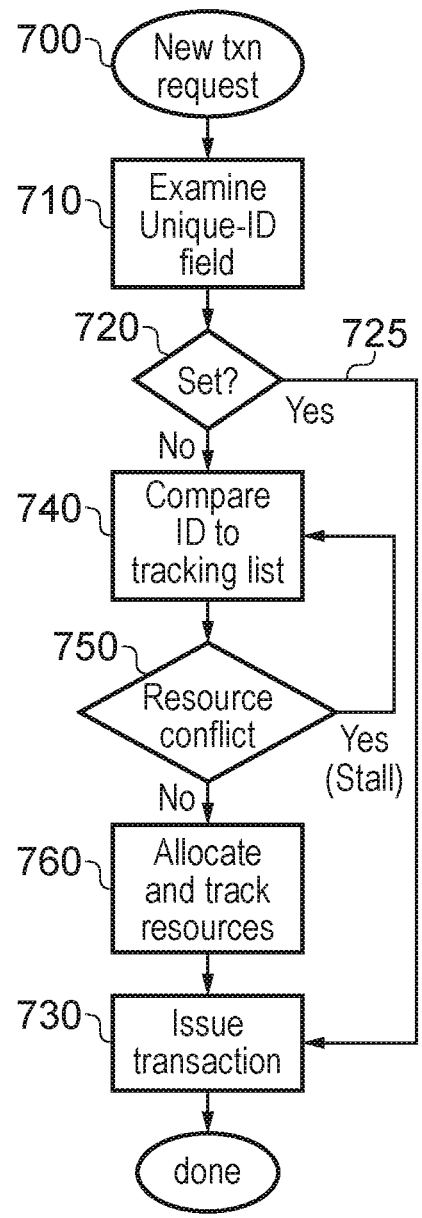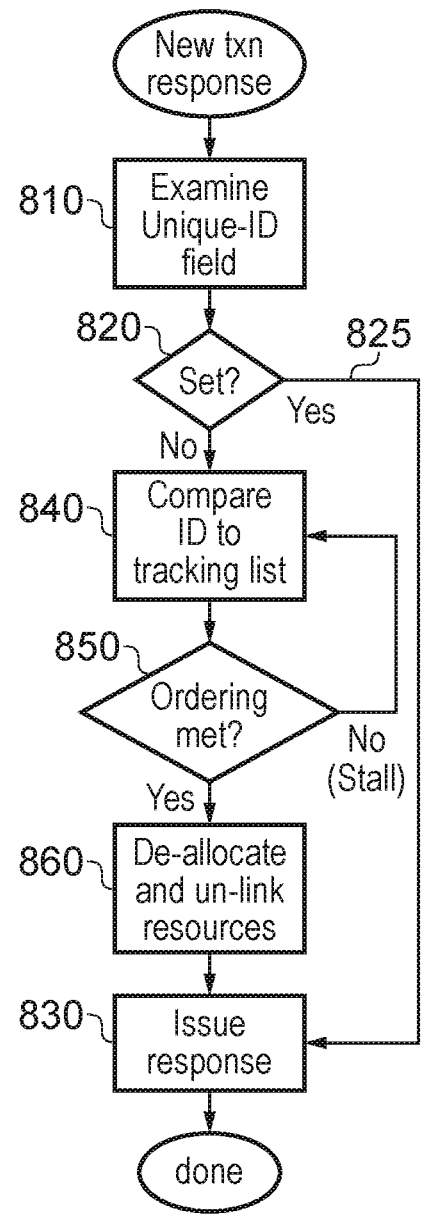
FIG. 7
FIG. 8

MANAGING TRANSACTION REQUEST IDENTIFIERS AND INDICATORS TO CONTROL OR BYPASS IN-ORDER HANDLING OF TRANSACTION REQUESTS

This application is the U.S. national phase of International Application No. PCT/GB2017/053725 filed 13 Dec. 2017, which designated the U.S. and claims priority to GB Patent Application No. 1621638.4 filed 19 Dec. 2016, the entire contents of each of which are hereby incorporated by reference.

BACKGROUND

This disclosure relates to transaction handling.

Some transaction handling protocols make use of identifiers associated with data processing transactions, so that an initiator device (which initiates a transaction) can await a response to a transaction and, when the response arrives from a transaction server device, can handle the response appropriately.

In some protocols, multiple concurrent transactions are able to be issued by an initiator device having the same identifier. An ordering requirement is generally applied to such sets of transactions. For example, the ordering requirement may be one or more of a requirement that the transaction is delivered to its destination in the transaction issue order, a requirement that i) a response to the transaction is returned to the initiator of the transaction in the transaction issue order, and a requirement that the transaction is completed in the transaction issue order.

However, instances can arise in which the ordering could potentially be compromised, for example where the set of transactions is handled by multiple server devices. In such instances, so-called ordering techniques can be used to avoid the ordering requirement being compromised. These techniques can include stalling transactions which are received or handled "early" relative to the ordering requirement, and/or buffering information relating to the transactions until the appropriate stage to forward such information.

SUMMARY

In an example arrangement there is provided a transaction handling device comprising:
transaction handling circuitry to handle a transaction request for a data processing transaction, the transaction request having an associated identifier such that at least an aspect of processing for each of a set of transaction requests having the same identifier must be performed in the order of issue of that set of transactions; and
detection circuitry to detect the state of an indicator associated with the identifier to indicate whether that identifier relates to more than one concurrently pending transaction request.

In another example arrangement there is provided an initiator device comprising:
transaction issue circuitry to issue a transaction request for a data processing transaction, the transaction request having an associated identifier such that at least an aspect of the processing for each of a set of transaction requests having the same identifier must be performed in the order of issue of that set of transactions;
the transaction issue circuitry being configured to associate an indicator with the identifier to indicate whether that identifier relates to more than one concurrently pending transaction request.

In another example arrangement there is provided a data signal representing a data handling transaction request, the data signal comprising an identifier such that at least an aspect of processing for each of a set of transaction requests having the same identifier must be performed in the order of issue of that set of transactions, and an indicator associated with the identifier to indicate whether that identifier relates to more than one concurrently pending transaction request In another example arrangement there is provided a method comprising:
handling a transaction request for a data processing transaction, the transaction request having an associated identifier such that at least an aspect of processing for each of a set of transaction requests having the same identifier must be performed in the order of issue of that set of transactions; and
detecting the state of an indicator associated with the identifier to indicate whether that identifier relates to more than one concurrently pending transaction request.

In another example arrangement there is provided a method comprising:
issuing a transaction request for a data processing transaction, the transaction request having an associated identifier such that at least an aspect of the processing for each of a set of transaction requests having the same identifier must be performed in the order of issue of that set of transactions; and
associating an indicator with the identifier to indicate whether that identifier relates to more than one concurrently pending transaction request.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 1 schematically illustrates a data processing apparatus;

FIGS. 2 and 3 schematically illustrate example transaction handling situations;

FIGS. 7 to 9 are schematic flowcharts illustrating methods of operation of transaction handling circuitry;

DESCRIPTION OF EMBODIMENTS

Figure 4:
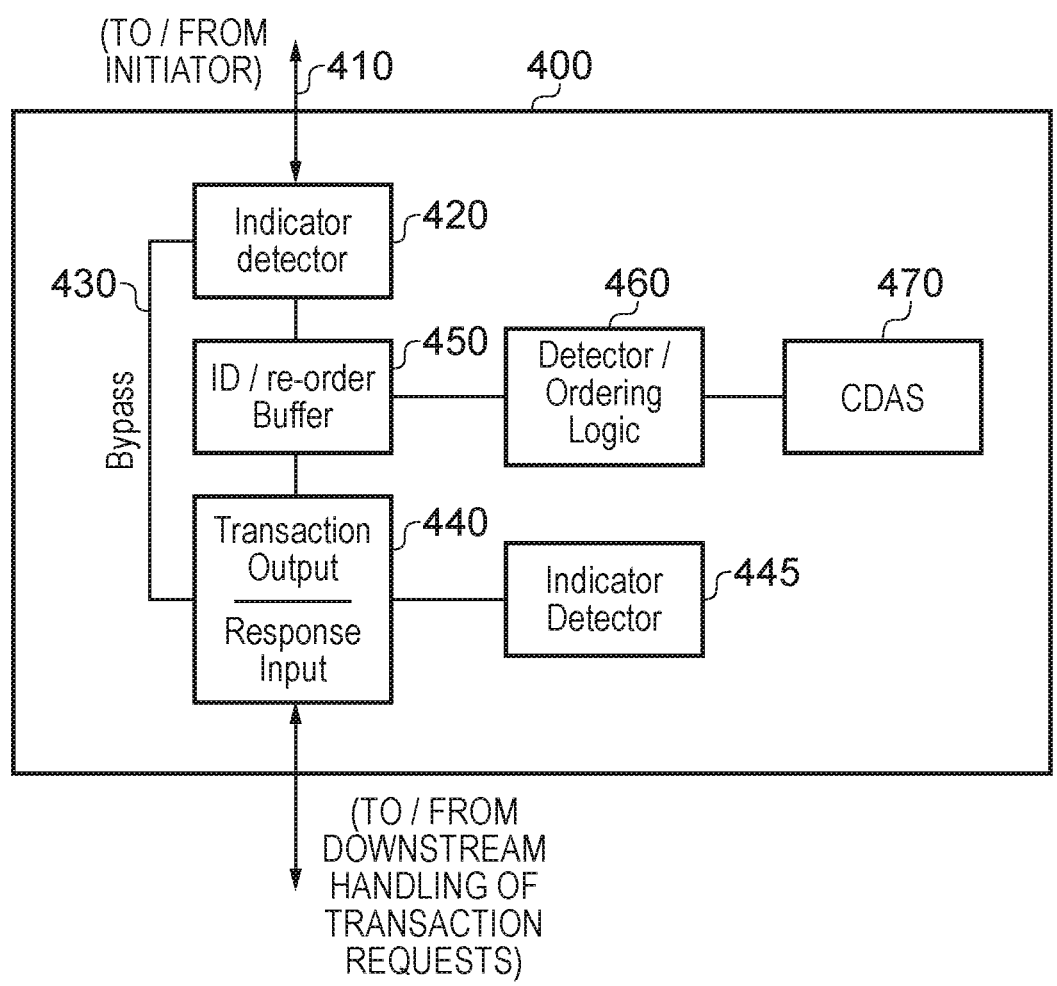
FIG. 4 schematically illustrates transaction handling circuitry.

Before discussing the embodiments with reference to the accompanying figures, the following description of embodiments is provided.

An example embodiment provides a transaction handling device comprising:
transaction handling circuitry to handle a transaction request for a data processing transaction, the transaction request having an associated identifier such that at least an aspect of processing for each of a set of transaction requests having the same identifier must be performed in the order of issue of that set of transactions; and detection circuitry to detect the state of an indicator associated with the identifier to indicate whether that identifier relates to more than one concurrently pending transaction request.

In the example arrangements, an indicator is provided to indicate whether an identifier relates to more than one concurrently pending transaction request. If not, then any reordering arrangements can conveniently be ignored or bypassed, because there is no ordering requirement imposed by a transaction identifier which does not relate to more than one concurrently pending transaction request.

An ordering requirement applicable to transaction request handling can be such that the aspect of processing comprises one or more selected from the list consisting of:
 (i) the transaction being delivered to its destination;
 (ii) a response to the transaction being returned to the initiator of the transaction; and
 (iii) the transaction being completed (for example, all of the processing relating to that transaction having been performed).

In example arrangements, ordering circuitry (as part of the transaction handling device) may comprise buffer circuitry to store data defining a set of requests having the same identifier; and comparator circuitry to detect whether the identifier associated with a newly received transaction is the same as the identifier for any transaction for which data is held by the buffer circuitry. In examples, the ordering circuitry is configured to output data defining those transactions held by the buffer circuitry having the same identifier, according to an order of issue of those transactions.

In example arrangements, the buffer circuitry may be configured to remove buffered data relating to a transaction identifier in response to a completion acknowledgement for that transaction identifier.

Re-ordering can be conveniently avoided in the case of transactions which do not share an identifier with another concurrently pending transaction, in arrangements in which the transaction handling circuitry is configured to bypass the ordering circuitry when handling a transaction request for which the detection circuitry detects that the indicator is set to indicate that the request identifier relates to only one concurrently pending request. In turn this allows less powerful (taking up less circuitry space, for example) ordering circuitry to be used, because at least some transaction may bypass it.

Another example embodiment provides an initiator device comprising:
 transaction issue circuitry to issue a transaction request for a data processing transaction, the transaction request having an associated identifier such that at least an aspect of the processing for each of a set of transaction requests having the same identifier must be performed in the order of issue of that set of transactions;
 the transaction issue circuitry being configured to associate an indicator with the identifier to indicate whether that identifier relates to more than one concurrently pending transaction request.

In example arrangements, a transaction identifier may be re-used (and still considered not to apply to another concurrently pending transaction) once an earlier transaction having that identifier has completed and (for example) its completion acknowledged to the initiator. Therefore, in example arrangements, the device is responsive to receipt of a completion acknowledgement relating to a transaction identifier, for which the indicator was set to indicate that the transaction related to only one concurrently pending transaction request, to allow the re-use of that transaction identifier for another request.

Because only a unique/not unique indication is needed in at least example embodiments, the indicator may be a one bit indicator.

Another example embodiment provides a data processing apparatus comprising:
 one or more transaction handling devices as defined above;
 one or more initiator devices as defined above; and
 interconnect circuitry to connect the one or more initiators to the one or more transaction handling devices.

To allow reordering to be avoided (in the case of unique identifiers) at various stages in the handling of a transaction, in example arrangements the apparatus is configured to associate the indicator with all transaction messages which include a transaction identifier.

Another example embodiment provides a data signal representing a data handling transaction request, the data signal comprising an identifier such that at least an aspect of processing for each of a set of transaction requests having the same identifier must be performed in the order of issue of that set of transactions, and an indicator associated with the identifier to indicate whether that identifier relates to more than one concurrently pending transaction request.

Another example embodiment provides a method comprising:
 handling a transaction request for a data processing transaction, the transaction request having an associated identifier such that at least an aspect of processing for each of a set of transaction requests having the same identifier must be performed in the order of issue of that set of transactions; and
 detecting the state of an indicator associated with the identifier to indicate whether that identifier relates to more than one concurrently pending transaction request.

Note that these steps may be carried out in parallel or implicitly. For example, a set of IDs in the initiator may be implicitly known to be unique because of other details of the operation of the initiator; that is there would not need to be two separately or serially implemented steps to encompass this functionality.

Another example embodiment provides a method comprising:
 issuing a transaction request for a data processing transaction, the transaction request having an associated identifier such that at least an aspect of the processing for each of a set of transaction requests having the same identifier must be performed in the order of issue of that set of transactions; and
 associating an indicator with the identifier to indicate whether that identifier relates to more than one concurrently pending transaction request.

Referring to the drawings, FIG. 1 schematically illustrates a data processing system comprising a number of master or transaction-initiating devices (otherwise referred to as initiators) 100, 110, 120, 130. The initiators 100, 110 operate according to the AXI (Advanced Extensible Interface) protocol. The initiators 120, 130 operate according to the CHI (Coherent Hub Interface) protocol.

The initiators 100, 110 are connected to an interconnect 140, and the initiators 120, 130 are connected to a cache coherent interconnect 150.

The interconnect 140, 150 are connected via an interconnect 160 to various slave nodes 170, 180 such as a main memory, a dynamic memory controller accessing a main memory or the like.

The data processing apparatus of FIG. 1 can be implemented as a so-called system on chip (SoC) or network on chip (NoC) system.

In operation, the initiators 100 . . . 130 issue so-called transaction requests relating to data processing operations. An example of a transaction request is a request to read data from a particular memory address or range of memory addresses. Another example is a request to write data to a memory address or a range of memory addresses. Other transaction requests may relate to matters such as invalidating a copy of certain data held at a particular node in the apparatus, or the like.

The initiators associate with each transaction a transaction identifier. In some instances, the transaction identifier can be "unique". The term "unique" does not imply uniqueness across the whole apparatus, nor does it imply uniqueness across the whole of time. Instead, uniqueness is defined as there being just one currently pending transaction from that particular initiator having that identifier. So, an identifier can be unique even though another initiator uses the same identifier, and an identifier can still be considered unique despite being used multiple times by the same initiator, if there is only one currently pending transaction with that identifier, which is to say, once the transaction with a particular identifier has been completed and its completion has been acknowledged back to the initiator, the same identifier can be used in a subsequent transaction without compromising its unique status.

A data processing transaction issued by an initiator is delivered, via the various interconnects, to a destination such as one of the slave nodes 170, 180. There, the processing relating to the transaction is performed and an appropriate response sent to the initiator of that transaction. At the end of processing relating to a transaction, a completion acknowledgement is sent to the initiator.

The CHI initiators 120, 130 are bound, by the CHI protocol, always to use unique identifiers as defined above.

However, the AXI initiators 100, 110 can use either unique identifiers or can issue a set of two or more transactions having the same identifier. Such an arrangement is allowed within the AXI and various other transaction handling protocols. A condition applied to such a set of transactions sharing an identifier, however, is that at least an aspect of processing for each of the set of transaction requests having the same identifier must be performed in the order of issue of that set of transactions. Examples of such an aspect of processing are one or more selected from the list consisting of:

The transaction being delivered to its destination (such as a slave node);

A response to the transaction being returned to the initiator; and

The transaction being completed (for example, that all of the processing relating to that transaction has completed being processed at the slave; in the example case of a write, the result of the write is now observable by any subsequent transaction to the same address).

It will be understood that more than one of these conditions can apply.

Bearing in mind the requirement for at least partially ordered processing of transaction requests sharing a transaction identifier, so-called reordering arrangements can be provided within the apparatus of FIG. 1 to ensure that the ordering requirement is met.

So, in order to satisfy the ordering constraint, when transactions with the same identifier are sent to destinations that may re-order them, in some examples arrangements they are either stalled or the system is provided with one or more re-order buffers. Such precautions are appropriate both to satisfy the ordering requirements of the protocol and to try to avoid associated deadlock conditions.

FIG. 1 therefore provides an example of data processing apparatus comprising one or more transaction handling devices; one or more initiator devices; and interconnect circuitry to connect the one or more initiators to the one or more transaction handling devices.

Note that a transaction handling device can be a slave device. But more generally it is a device downstream of the initiator. So, an interconnect, or a part of an interconnect, can be a transaction handling device.

FIG. 2 schematically illustrates a situation in which re-ordering may be required. A master or initiator device 200 sends a set of transaction sharing a transaction identifier to a pair of slave devices 210, 220. In other words, of the set of transaction requests sharing an identifier, some are handled by the slave device 210 in this example, and some by the slave device 220. The responses received from the two slave devices may be independent of one another in terms of their timing and/or ordering. So, in order to comply with the ordering requirement, logic 230 is used to provide re-ordering.

The logic 230 provides the functions of tracking identifiers relating to already in-progress transactions, comparing a newly received transaction request with those identifiers, in some instances providing a re-order buffer so that the results of transactions can be temporarily buffered until they can be issued back to the initiator in the appropriate order, and in some instances providing circuitry relating to CDAS (Cyclic Dependency Avoidance Scheme) which again controls the order in which transactions can be forwarded to the slave devices 210, 220 in this example in order to avoid deadlocks caused by having to stall the responses from the slave devices 210, 220.

Another example arrangement in which such issues can occur is shown in FIG. 3, in which an AXI-compliant master or initiator 300 is issuing transaction requests to a CHI-compliant slave or other domain 310. Again, between the master device and the slave device (for example as part of interconnect circuitry), logic 320 is provided with the functionality of the logic 230 as discussed above and in order to act as a bridge between the two protocols.

Examples of the present technique provide an indicator associated with the transaction identifier to indicate whether that identifier relates to more than one concurrently pending transaction request.

In some examples, the indicator may be a one-bit indicator (since only a unique/not unique indication is required). Although the indicator could be multiplexed onto the same connections already used to convey the identifier (or other data field), for speed and convenience the indicator can be carried, in some example arrangements, by an additional connection. Although the indicator could just be provided from the initiator to the first downstream stage which has a reordering capability, in example arrangements it is associated with all transaction messages (including responses and completion acknowledgements for example) carrying the identifier.

An example format of the identifier and indicator is:

| Indicator (1 bit) | Identifier (6 bits) |
|---|---|
| 0b1 | 0b101010 |

A transaction-related message carrying this information provides an example of a data signal representing a data handling transaction request, the data signal comprising an identifier such that at least an aspect of processing for each of a set of transaction requests having the same identifier must be performed in the order of issue of that set of transactions, and an indicator associated with the identifier to indicate whether that identifier relates to more than one concurrently pending transaction request.

Techniques for providing the indicator will be discussed below. First, FIG. 4 schematically represents an example of the logic 230, 320 providing a transaction ordering function.

Referring to FIG. 4, the circuitry 400 receives transactions at a transaction input 410 (also functioning as a response output—to be described below) with their associated indicators. Detection circuitry acting as an indicator detector 420 detects whether the indicator associated with a received transaction request indicates that the identifier is unique as discussed above. If the transaction identifier is unique, then reordering is not required and the transaction can be forwarded via a bypass path 430 to a transaction output 440 (also functioning as a response input, to be discussed below).

If, however, the identifier is not unique (as indicated by the indicator) then circuitry including an identifier and/or re-order buffer 450, a detector and ordering logic 460 and CDAS circuitry 470 are provided to handle the correct ordering of the transaction. The operation of these units will be discussed in detail below. The transaction request is output by the transaction output 440.

In response to processing the transaction request by the destination device, a response is generated to be passed back to the initiator. The response may include data provided in response to a read request. The response may include a completion acknowledgement indicating that a processing operation has been carried out.

The response input 440 refers the received response to an indicator detector 445 (which is shown separately in FIG. 4 for clarity of the diagram, but which may be implemented by the same logic as the indicator detector 420). If the indicator indicates that the response relates to a transaction request having a unique identifier, the response can be passed by the bypass path 430 for output 410. If, however, the indicator indicates that the response relates to a transaction request having a non-unique identifier, then the response is passed to the buffer 450, detector/ordering logic 460, CDAS 470 for handling in a manner to be discussed below before being output, so as (in example arrangements) to output data defining those transactions held by the buffer circuitry having the same identifier, according to an order of issue (by the relevant initiator) of those transactions.

FIG. 4 therefore provides an example of ordering circuitry (450, 460, 470) comprising buffer circuitry (450) to store data defining a set of requests having the same identifier; and comparator circuitry (460) to detect whether the identifier associated with a newly received transaction is the same as the identifier for any transaction for which data is held by the buffer circuitry. The transaction handling circuitry 400 is configured to bypass the ordering circuitry (for example, by the bypass path 430) when handling a transaction request for which the detection circuitry detects that the indicator is set to indicate that the request identifier relates to only one concurrently pending request.

Figure 5:
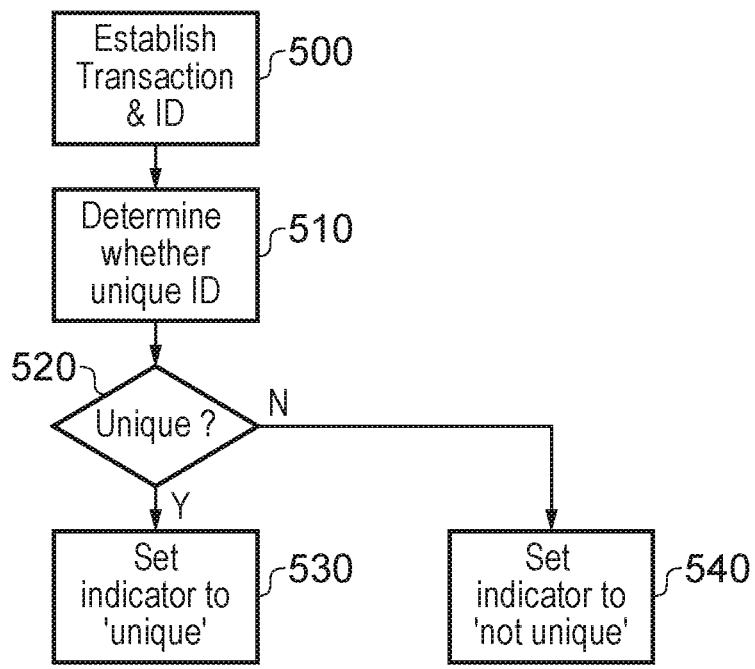
FIGS. 5 and 6 are schematic flowcharts illustrating methods of operation of an initiator device.

FIG. 5 is a schematic flow chart illustrating operations at a transaction initiator.

At a step 500, the initiator establishes a transaction to be issued and assigns an identifier to that transaction.

At a step 510, the initiator determines whether the identifier is unique, which is to say the identifier is not used in respect of any other currently pending transaction and that the transaction itself is not one of a set of transactions for which the same identifier will need to be reused.

Note that these steps may be carried out in parallel or implicitly. For example, a set of IDs in the initiator may be implicitly known to be unique because of other details of the operation of the initiator; that is there would not need to be two separately or serially implemented steps to encompass this functionality.

The initiator generates the transaction and is therefore aware of whether the identifier is being used in a unique manner or not. For example, the transaction may be one of a group of transactions to handle data transfers to or from a group of line fill buffers or other cache memory areas at the initiator, in which case the initiator is aware, as the transactions are being assigned a shared identifier, that the identifier is being used non-uniquely in respect of multiple transaction requests. In another example, the initiator may be connected to or associated with another domain which provides a set or stream of transactions to be forwarded as requests, all having the same identifier. In another example, the transactions may be such that the initiator device does not have a reordering capability (or sufficient capability) to receive transaction responses in any order and so uses the same identifier to ensure that responses are received in a known order.

If, at a step 520, the identifier is detected to be unique then control passes to a step 530 at which the indicator is set to indicate uniqueness. If not, then control passes to a step 540 at which the indicator is set to indicate a lack of uniqueness.

Figure 6:
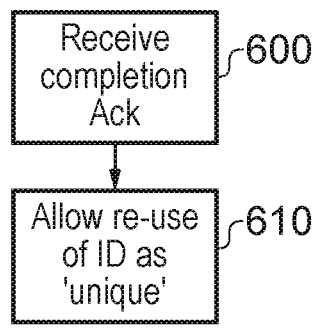

FIG. 6 is a schematic flow chart representing operations at an initiator, in which at a step 600, the initiator receives a completion acknowledgement in respect of a particular identifier, and at a step 610 allows the re-use of that identifier as a unique identifier. This is an example of the initiator device being responsive to receipt of a completion acknowledgement relating to a transaction identifier, for which the indicator was set to indicate that the transaction related to only one concurrently pending transaction request, to allow the re-use of that transaction identifier for another request.

Figure 9:
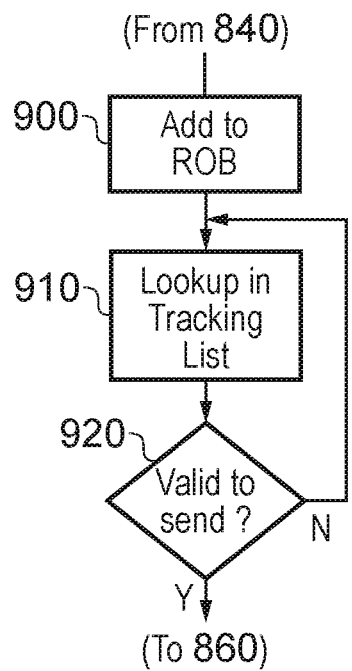

FIG. 7 is a schematic flow chart relating to the circuitry of FIG. 4. FIG. 7 relates to the handling of a newly received transaction (a generally downward path as drawn in FIG. 4). FIGS. 8 and 9 to be discussed below relate to the handling of a newly received transaction response (a generally upward path as drawn in FIG. 4).

At a step 700, a new transaction request is received at the input 410.

At a step 710, the detector 420 examines the indicator and, at a step 720, if the indicator is set to indicate uniqueness, the transaction is routed via the bypass path 430 (as represented by the "yes" branch 725) and the transaction is issued by the output 440 at a step 730.

If the unique identifier is not set to indicate uniqueness (or is set to indicate non-uniqueness), then control passes to a step 740, implemented by the buffer 450, the logic 460 and, where appropriate, the CDAS 470. At the step 740 the identifier of the newly received transaction request is compared to a tracking list of identifiers for currently pending transactions held by the buffer 450. If the identifier is already present in the list, data defining the newly received transaction is added to the list in an ordered position relative to the one or more entries in the list, to indicate that the newly received transaction has been received after those transactions already in the list. If the identifier is not already in the list, then data defining the transaction is added to the list. Entries in the list persist until a completion acknowledgement is subsequently received relating to that identifier, as an example of the buffer circuitry being configured to remove buffered data relating to a transaction identifier in response to a completion acknowledgement for that transaction identifier. Note however that in an arrangement using re-order buffers, the entry may persist until the completion acknowledgement is both received and then sent on from the buffer. This is because it may be received in the wrong order so needs to remain tracked until it is valid to be sent.

If there is any resource conflict or ordering issue, then at a step 750 the transaction is stalled until, as a "no" outcome of the step 750, the transaction is prepared for issue by allocating and tracking resources at a step 760. Control then passes to the step 730 at which the transaction is issued. If there is a resourcing conflict, then the transaction request is stalled until the conflict has been resolved (for example, by an earlier-received transaction having the same identifier being completed). As an alternative to stalling, the request can be added to a re-order buffer (which may be implemented by the buffer 450). The re-order buffer stores the request itself, rather than just storing data defining the request. So, there is no need to stall receipt and processing of the request from the node which provides it; the request can be accepted and then stored by the re-order buffer until the appropriate stage to forward the request.

FIG. 8 relates to a similar situation but in respect of a transaction response received (at the input 440) from a slave or other node which was destination of the transaction.

At a step 810, the indicator field is examined to detect whether the identifier is unique as discussed above. If, at a step 820, the indicator is unique then (as a "yes" branch 825) control passes (by the bypass path 430) to a step 830 at which the response is issued back towards the initiator.

If, however, the outcome at the step 820 is "no" then control passes to a step 840 at which the identifier of the transaction response is compared to the tracking list held by the buffer 450. If, at a step 850, an ordering requirement is met (for example, either the response has been received in the correct sequence relative to other responses, or there is (in this particular example) no ordering requirement for the order of receipt of responses), then control passes to a step 860 at which the resources used by the transaction are de-allocated and un-linked and the response is issued at the step 830. If, however, the outcome at the step 850 is "no" then control passes back to the step 840 in a stall situation until the ordering requirement is met. that is to say, the response is stalled until responses which are required (by the ordering requirement) to be received by the initiator earlier than the current response are available.

FIG. 9 schematically illustrates an alternative to stalling the transaction at the "no" outcome of step 850. The steps shown in FIG. 9 replace the step 850 in FIG. 8, with the remainder of FIG. 8 remaining the same.

With control passes from the step 840, at a step 900 the response is added to a re-order buffer (which may be implemented by the buffer 450). The re-order buffer stores the response itself, rather than just storing data defining the response. So, there is no need to stall receipt and processing of the response from the node which provides it; the response can be accepted and then stored by the re-order buffer until the appropriate stage to forward the response. At a step 910 the ID tracking list is consulted to detect, at a step 920, whether the transaction response is valid to be issued. If the answer is "no" then control passes back to the step 910, whereas if the answer is "yes" then control passes to the step 860.

Figures 10, 11:
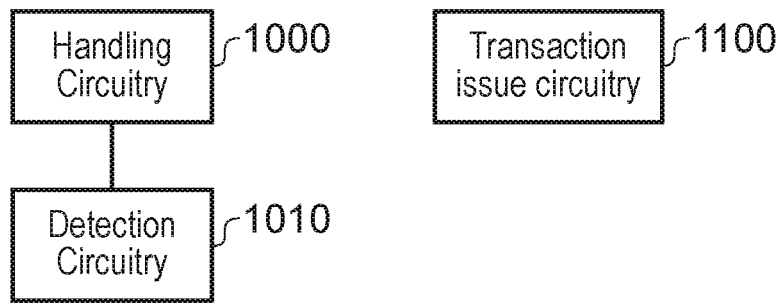
FIG. 10 schematically illustrates transaction handling circuitry.
FIG. 11 schematically illustrates an initiator device.

FIG. 10 schematically illustrates a summary embodiment of a transaction handling device comprising transaction handling circuitry 1000 to handle a transaction request for a data processing transaction, the transaction request having an associated identifier such that at least an aspect of processing for each of a set of transaction requests having the same identifier must be performed in the order of issue of that set of transactions; and detection circuitry 1010 to detect the state of an indicator associated with the identifier to indicate whether that identifier relates to more than one concurrently pending transaction request.

FIG. 11 schematically illustrates a summary embodiment of an initiator device comprising transaction issue circuitry 1100 to issue a transaction request for a data processing transaction, the transaction request having an associated identifier such that at least an aspect of the processing for each of a set of transaction requests having the same identifier must be performed in the order of issue of that set of transactions; the transaction issue circuitry being configured to associate an indicator with the identifier to indicate whether that identifier relates to more than one concurrently pending transaction request.

Figures 12, 13:
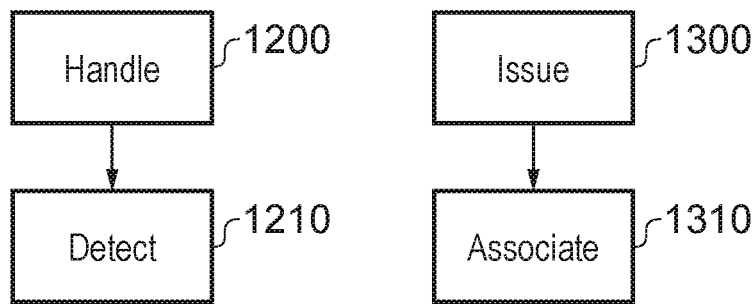
FIGS. 12 and 13 are schematic flowcharts illustrating summary methods.

FIG. 12 is a schematic flowchart illustrating a method comprising:

handling (at a step 1200) a transaction request for a data processing transaction, the transaction request having an associated identifier such that at least an aspect of processing for each of a set of transaction requests having the same identifier must be performed in the order of issue of that set of transactions; and detecting (at a step 1210) the state of an indicator associated with the identifier to indicate whether that identifier relates to more than one concurrently pending transaction request.

Note that these steps may be carried out in parallel or implicitly. For example, a set of IDs in the initiator may be implicitly known to be unique because of other details of the operation of the initiator; that is there would not need to be two separately or serially implemented steps to encompass this functionality.

FIG. 13 is a schematic flowchart illustrating a method comprising:

issuing (at a step 1300) a transaction request for a data processing transaction, the transaction request having an associated identifier such that at least an aspect of the processing for each of a set of transaction requests having the same identifier must be performed in the order of issue of that set of transactions; and associating (at a step 1310) an indicator with the identifier to indicate whether that identifier relates to more than one concurrently pending transaction request.

As an example technique for providing backwards compatibility, when a AXI initiator (or pre-existing subsystem) not implementing these techniques is connected to an interconnect or slave which uses these techniques, the indicator can be set (or hard-wired) to indicate "not unique", which will always give the correct ordering behaviour. If the system integrator has prior knowledge that the AXI initiator or subsystem not using these techniques always generates unique IDs, the indicator can be set or hard-wired to "unique" at the input to the interconnect or slave which uses these techniques, rather than it coming with the transactions.

In example arrangements the present techniques can contribute to saving circuit area in an integrated circuit implementation. This can be the case if the system architect has some knowledge of the properties of the masters, in particular how much bandwidth they require for transactions that do not use unique IDs. A design tool may help with this decision. For example, the design tool may take input about the requirements and/or unique ID behaviour of a master (for example, from a model or input directly into the design tool as a form of specification) and use this information to configure a more optimal size of, or presence of, ordering circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing apparatus comprising:
   one or more transaction handling devices each comprising transaction handling circuitry to handle a transaction request signal for a data processing transaction, the transaction request signal having an associated identifier such that at least an aspect of processing for each of a set of transaction request signals having the same identifier must be performed in the order of issue of that set of transactions;
   detection circuitry configured to detect the state of an indicator associated with the identifier to indicate whether that identifier relates to more than one concurrently pending transaction request signal;
   one or more initiator devices each initiator device comprising:
      transaction issue circuitry configured to issue the transaction request signal for the data processing transaction and to associate an indicator with the identifier to indicate whether that identifier relates to more than one concurrently pending transaction request signal;
      in which the initiator device is responsive to receipt of a completion acknowledgement relating to a transaction identifier for which the indicator was set to indicate that the transaction related to only one concurrently pending transaction request signal, to allow the re-use of that transaction identifier for another request; and
   interconnect circuitry configured to connect the one or more initiator devices to the one or more transaction handling devices, in which the one or more transaction handling devices each comprise ordering circuitry, the ordering circuitry comprising:
      transaction request buffer circuitry configured to store data defining a set of transaction request signals having the same identifier; and
      comparator circuitry configured to detect whether the identifier associated with a newly received transaction request signal is the same as the identifier for any transaction request signal for which data is held by the transaction request buffer circuitry, in which
      the transaction handling circuitry is configured to bypass the ordering circuitry when handling a transaction request signal for which the detection circuitry detects that the indicator is set to indicate that the request identifier relates to only one concurrently pending transaction request signal, in which
   the data processing apparatus is configured to associate the indicator with all transaction messages which include a transaction identifier.

2. The initiator device of claim 1, in which the aspect of processing comprises one or more selected from the list consisting of:
   (i) the transaction request signal being delivered to its destination;
   (ii) a response to the transaction request signal being returned to the initiator device; and
   (iii) the data processing transaction defined by the transaction request signal being completed.

3. The initiator device of claim 1, in which the indicator is a one bit indicator.

4. The data processing apparatus of claim 1, in which the data processing apparatus is configured to carry the indicator by all transaction messages including transaction request signals, transaction response signals, and transaction completion acknowledgement signals which carry the transaction identifier.

5. The data processing apparatus of claim 1, in which the ordering circuitry is configured to output data defining transaction request signals held by the transaction request buffer circuitry having the same transaction identifier, according to an order of issue of those transaction request signals.

6. The data processing apparatus of claim 1, in which the transaction request buffer circuitry is configured to remove buffered data relating to a transaction identifier in response to a completion acknowledgement signal for that transaction identifier.

7. The data processing apparatus of claim 1, in which the transaction identifier includes multiple data bits and the associated indicator includes one or more data bits.

8. A method comprising:
   issuing, a transaction request signal for a data processing transaction, the transaction request signal having an associated identifier such that at least an aspect of the processing for each of a set of transaction request signals having the same identifier must be performed in the order of issue of that set of transactions;
   associating, an indicator with the identifier to indicate whether that identifier relates to more than one concurrently pending transaction request signal;

handling the transaction request signal for the data processing transaction;

detecting the state of an indicator associated with the identifier to indicate whether that identifier relates to more than one concurrently pending transaction request signal, in which the step of handling the transaction request signal comprises ordering, the ordering comprising:

storing data defining a set of transaction request signals having the same identifier in a transaction request buffer; and detecting whether the identifier associated with a newly received transaction request signal is the same as the identifier for any transaction request signal in which data is held by the transaction request buffer, the step of handling the transaction request signal comprises bypassing the ordering when handling a transaction request signal for which the step of detecting the state of the indicator detects that the indicator is set to indicate that the request identifier relates to only one concurrently pending request; and in response to receipt of a completion acknowledgement relating to a transaction identifier, for which the indicator was set to indicate that the transaction related to only one concurrently pending transaction request signal, allowing the re-use of that transaction identifier for another request, in which the indicator is associated with all transaction messages which include a transaction identifier.

* * * * *